(12) United States Patent
O'Hare et al.

(10) Patent No.: US 6,766,397 B2
(45) Date of Patent: Jul. 20, 2004

(54) CONTROLLING ACCESS TO A STORAGE DEVICE

(75) Inventors: Jeremy J. O'Hare, Hopkinton, MA (US); Sashe K. Kanapathi, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 436 days.

(21) Appl. No.: 09/774,532

(22) Filed: Jan. 31, 2001

(65) Prior Publication Data

US 2001/0027501 A1 Oct. 4, 2001

Related U.S. Application Data

(63) Continuation-in-part of application No. 09/604,592, filed on Jun. 27, 2000, now Pat. No. 6,484,173, which is a continuation-in-part of application No. 09/533,009, filed on Mar. 22, 2000, now Pat. No. 6,553,471.
(60) Provisional application No. 60/180,632, filed on Feb. 7, 2000.

(51) Int. Cl.[7] .............................................. G06F 12/00
(52) U.S. Cl. ........................... 710/200; 711/5; 711/170
(58) Field of Search ..................... 710/36, 200, 316; 709/215, 217, 219, 221, 223–226; 711/163, 164; 707/9; 713/200, 201, 202

(56) References Cited

U.S. PATENT DOCUMENTS

| | | | | |
|---|---|---|---|---|
| 5,774,650 A | * | 6/1998 | Chapman et al. ........... | 713/200 |
| 5,860,137 A | * | 1/1999 | Raz et al. .................... | 711/202 |
| 6,105,122 A | * | 8/2000 | Muller et al. ................... | 712/1 |
| 6,295,575 B1 | * | 9/2001 | Blumenau et al. ............. | 711/5 |
| 6,484,173 B1 | * | 11/2002 | O'Hare et al. .................. | 707/9 |
| 6,606,695 B2 | * | 8/2003 | Kamano et al. ............ | 711/163 |
| 6,633,962 B1 | * | 10/2003 | Burton et al. ................ | 711/163 |

* cited by examiner

Primary Examiner—Khanh Dang
(74) Attorney, Agent, or Firm—Choate, Hall & Stewart

(57) ABSTRACT

Determining authorization for actions includes defining a plurality of groups, defining a plurality of action types and corresponding levels of authorization for each of the groups, for at least a subset of the action types, defining a plurality of devices on which corresponding actions may be performed, wherein at least some of the devices correspond to portions of a data storage device, and, for the at least one of the groups, determining authorization for a requested action, where if the action corresponds to one of the devices, authorization is determined by examining the levels of authorization for action types corresponding to the at least one group and by examining the plurality of devices corresponding to the requested action and where if the action does not correspond to one of the devices, authorization is determined by examining the levels of authorization for action types corresponding to the at least one group. The action types may include system calls to the data storage device. The at least one of the devices may include at least one disk storage area of the data storage device. The at least one of the devices may include communication ports of the data storage device. The action types may indicate whether system calls are allowed on the communication ports. In response to a requested action being authorized, a tag may be returned that may be used in connection with subsequent requests that the action be performed.

18 Claims, 7 Drawing Sheets

Fig. 5

| DEVICE POOLS →<br>REQUESTOR GROUPS ↓ | W,X,Y,Z | W | X | W,Z | X,Y |
|---|---|---|---|---|---|
| Q,R,S,T | NONE | B,C,M | B,C | B,M | NONE |
| Q | B,C,M | B,C,M | B,C,M | B,C,M | B,C,M |
| R,S | NONE | B,C,M | B,C | B,M | NONE |
| V | NONE | NONE | B | NONE | NONE |
| S | B,C | B,C,M | B,C | B,M | B,C,M |
| | 102 | 104 | 106 | 108 | 110 |
| | | 112 | 114 | 116 | 118 | 120 |

100

CONTROLLING ACCESS TO A STORAGE DEVICE

CROSS REFERENCE TO RELATED APPLICATIONS

This application is a CIP of U.S. patent application Ser. No. 09/604,592 filed on Jun. 27, 2000 (now U.S. Pat. No. 6,484,173), which is a CIP of U.S. patent application Ser. No. 09/533,009 filed on Mar. 22, 2000 (now U.S. Pat. No. 6,553,471) and claims priority to U.S. provisional patent application No. 60/180,632 filed on Feb. 7, 2000 (now abandoned), which is incorporated herein by reference.

BACKGROUND OF THE INVENTION

1. Field of the Invention

This application relates to the field of computer data storage and more particularly to the field of configuring control system call access to data storage devices.

2. Description of Related Art

Host systems may store and retrieve data using a data storage device containing a plurality of host interface units (ports) that communicate with and store and retrieve data on internal storage facilities provided within the data storage device. Such data storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek.

The host systems may be assigned limited access to specific portions of the internal storage facilities, where that access may include reading and writing data and "system calls" that cause the data storage device to execute administrative-like operations (e.g., automatic mirroring, copying, back up). The system calls do not directly read and write data. However, even so, system calls may cause one of the user host systems to indirectly access data allocated to another one of the host systems. In addition, remote system calls may be issued to a storage element through a remote storage device (e.g., in a disaster recovery situation) or through a fabric port.

The use of system calls which may provide one host system with unintended indirect access to a memory resource allocated to another host system may not be a problem if all host systems and the entire storage device are controlled by a single entity (i.e., are all owned and operated by a single company) that is capable of coordinating access among different groups within the entity. However, in instances where not all of the host systems are controlled by a single entity (e.g., in instances where a plurality of different smaller companies share use of a single data storage device) and in instances where different groups of the same entity access the host systems in an uncoordinated manner, it may be undesirable to allow such indirect access of internal storage facilities using system calls, especially in instances where the data storage device contains sensitive data of one or more of the entities and/or groups within a single entity. Furthermore, in configurations where a storage device is coupled to additional storage devices to provide backup services therefor, it may be undesirable to allow unintended access to data via system calls.

SUMMARY OF THE INVENTION

According to the present invention, determining authorization for actions includes defining a plurality of groups, defining a plurality of action types and corresponding levels of authorization for each of the groups, for at least a subset of the action types, defining a plurality of devices on which corresponding actions may be performed, where at least some of the devices correspond to portions of a data storage device, and, for the at least one of the groups, determining authorization for a requested action, where if the action corresponds to one of the devices, authorization is determined by examining the levels of authorization for action types corresponding to the at least one group and by examining the plurality of devices corresponding to the requested action and where if the action does not correspond to one of the devices, authorization is determined by examining the levels of authorization for action types corresponding to the at least one group. The action types may include system calls to the data storage device. The at least one of the devices may include at least one disk storage area of the data storage device. The at least one of the devices may include communication ports of the data storage device. The action types may indicate whether system calls are allowed on the communication ports. In response to a requested action being authorized, a tag may be returned that may be used in connection with subsequent requests that the action be performed.

According further to the present invention, determining authorization for actions includes determining if a requestor is in a list of requestors, determining if the requested action is in a list of action types associated with the requestor, and, if the action uses at least one device, determining if the at least one device is in a list of devices associated with the requestor and the requested action, where the list of devices includes at least some devices associated with a data storage device. Determining authorization may also include, if the requestor is not in the list of requestors, using a default requestor from the list of requestors. Determining authorization may also include, if the requestor is not in the list of requestors, denying authorization. Determining authorization may also include, if the requested action does not use at least one device, authorizing the action if the requested action is in a list of action types associated with the requestor. At least some of the action types may not correspond to actions performed on the data storage device. The action types may include system calls to the data storage device. At least one of the devices may include at least one disk storage area of the data storage device. The at least one of the devices may include communication ports of the data storage device. The action types may indicate whether system calls are allowed on the communication ports. Determining authorization may also include, in response to a requested action being authorized, returning a tag that may be used in connection with subsequent requests that the action be performed.

According further to the present invention, an apparatus that determines authorization for actions includes means for defining a plurality of groups, means for defining a plurality of action types and corresponding levels of authorization for each of the groups, means for defining a plurality of devices on which corresponding actions may be performed for at least a subset of the action types, where at least some of the devices correspond to portions of a data storage device, and, means for determining authorization for a requested action for the at least one of the groups, where if the action corresponds to one of the devices, authorization is determined by examining the levels of authorization for action types corresponding to the at least one group and by examining the plurality of devices corresponding to the requested action and where if the action does not correspond to one of the devices, authorization is determined by examining the levels of authorization for action types corresponding to the at least one group. The action types may include system calls to the data storage device. The at least one of the devices may include at least one disk storage area of the data storage device. The at least one of the devices may include communication ports of the data storage device. The action types may indicate whether system calls are allowed on the communication ports. In response to a requested action being authorized, the apparatus may return a tag that may be used in connection with subsequent requests that the action be performed.

According further to the present invention, an apparatus that determines authorization for actions includes means for determining if a requestor is in a list of requestors, means for determining if the requested action is in a list of action types associated with the requestor, and means for determining if the at least one device is in a list of devices associated with the requestor and the requested action if the action uses at least one device, where the list of devices includes at least some devices associated with a data storage device. The apparatus may also include means for using a default requestor from the list of requestors if the requestor is not in the list of requestors. The apparatus may also include means for denying authorization if the requestor is not in the list of requestors. The apparatus may also include means for authorizing the action if the requested action is in a list of action types associated with the requestor if the requested action does not use at least one device. At least some of the action types may not correspond to actions performed on the data storage device. The action types may include system calls to the data storage device. At least one of the devices may includes at least one disk storage area of the data storage device. The at least one of the devices may include communication ports of the data storage device. The action types may indicate whether system calls are allowed on the communication ports. The apparatus may include means for returning a tag that may be used in connection with subsequent requests that the action be performed in response to a requested action being authorized.

According further to the present invention, computer software that determines authorization for actions includes executable code that accesses a plurality of groups, executable code that accesses a plurality of action types and corresponding levels of authorization for each of the groups, executable code that accesses a plurality of devices on which corresponding actions may be performed for at least a subset of the action types, where at least some of the devices correspond to portions of a data storage device, and, executable code that determines authorization for a requested action for the at least one of the groups, where if the action corresponds to one of the devices, authorization is determined by examining the levels of authorization for action types corresponding to the at least one group and by examining the plurality of devices corresponding to the requested action and where if the action does not correspond to one of the devices, authorization is determined by examining the levels of authorization for action types corresponding to the at least one group. The action types may include system calls to the data storage device. The at least one of the devices may include at least one disk storage area of the data storage device. The at least one of the devices may include communication ports of the data storage device. The action types may indicate whether system calls are allowed on the communication ports. In response to a requested action being authorized, executable code may return a tag that may be used in connection with subsequent requests that the action be performed.

According further to the present invention, computer software that determines authorization for actions includes executable code that determines if a requestor is in a list of requestors, executable code that determines if the requested action is in a list of action types associated with the requestor, and executable code that determines if the at least one device is in a list of devices associated with the requestor and the requested action if the action uses at least one device, where the list of devices includes at least some devices associated with a data storage device. The computer software may further include executable code that uses a default requestor from the list of requestors if the requestor is not in the list of requestors. The computer software may further include executable code that denies authorization if the requestor is not in the list of requestors. The computer software may further include executable code that authorizes the action if the requested action is in a list of action types associated with the requestor if the requested action does not use at least one device. At least some of the action types may not correspond to actions performed on the data storage device. The action types may include system calls to the data storage device. The at least one of the devices may include at least one disk storage area of the data storage device. The at least one of the devices may include communication ports of the data storage device. The action types may indicate whether system calls are allowed on the communication ports. The computer software may further include executable code that returns a tag that may be used in connection with subsequent requests that the action be performed in response to a requested action being authorized.

BRIEF DESCRIPTION OF DRAWINGS

FIG. 5 is a table showing the association between the requestor and the storage element and the allowable system calls.

DETAILED DESCRIPTION OF THE PREFERRED EMBODIMENTS

Figure 1:
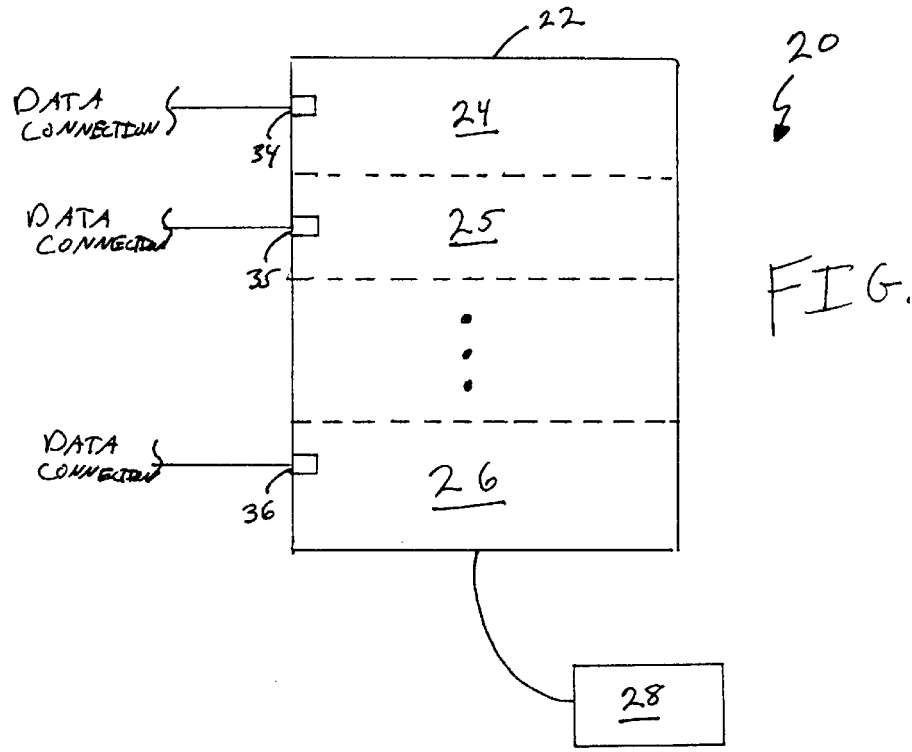
FIG. 1 is a schematic diagram that illustrates a storage device configured according to the present invention.

Referring to FIG. 1, a system 20 includes a data storage device 22 capable of storing data for a plurality of host systems coupled thereto (not shown), via the data connections. The host systems may include one or more host processors or other data storage devices. The data storage device 22 may be implemented using a Symmetrix storage device manufactured by EMC Corporation of Hopkinton, Mass. or by other types of data storage devices capable of providing the functionality described herein.

The data storage device 22 is shown as being partitioned into a plurality of sections 24–26, each of which represents a portion of the resources of the data storage device 22 that are accessed by one of the host systems coupled thereto (e.g., a host processor or another data storage device). These resources may include, for example, portions of the internal memory of the data storage device 22.

An external control device 28 may be coupled in a conventional manner to the data storage device 22 to control operations thereof. The external control device 28 may be implemented using the Symmetrix SymmWin functionality, which is provided by EMC Corporation of Hopkinton, Mass. as software for operation on a conventional computer workstation and other appropriate software and hardware to facilitate connection and communication between the workstation and the data storage device 22. In some embodiments, the external control device 28 acts like a dumb terminal that communicates with the data storage device 22 using conventional software provided therewith for that purpose. Operations performed by the external control device 28 are discussed in more detail hereinafter.

The data storage device 22 also includes a plurality of external ports 34–36 which provide communication for the host systems coupled to the storage device 22. The ports 34–36 allow the host systems to store data to and retrieve data from the data storage device 22. Each of the ports 34–36 handles communication for one of the host systems coupled to the data storage device 22.

The host systems coupled to the data storage device 22 may control the data storage device 22 and may control access and use of the sections 24–26 of the data storage device 22 by using administrative-like system calls that may be provided through the ports 34–36. Such system calls may, in effect, control configuration and operation of the data storage device 22. In some embodiments, system calls are differentiated from calls that simply read and write data from and to the ports 34–36 even though, as discussed above, some system calls may indirectly cause data stored in the data storage device 22 to be affected.

In instances where the data storage device 22 and all of the host systems coupled thereto are controlled by a single entity, then having the host systems perform system calls that may affect access by other ones of the host systems is straight-forward. However, in instances where the host systems may be controlled by different entities, or different groups within the same entity, then it may become problematic to allow one host system to make a system call that could affect one of the sections 24–26 of the data storage device 22 allotted to another host system controlled by a different entity. In other words, system calls made by host systems controlled by different entities could conflict.

In order to address such situations, some or all of the ports 34–36 of the data storage device 22 may be configured not to accept system calls from the host systems (or any other device for that matter) coupled thereto. Since the system calls may modify the configuration and access scheme of the data storage device 22, then restricting system calls at some or all of the ports 34–36 inhibits the host systems coupled thereto from accessing the resources allocated to other host systems. Thus, for example, if the section 24 represents the storage memory allocated to the host system coupled to the port 34 and the section 25 represents storage memory allocated to the host system coupled to the port 35, then inhibiting system calls at the ports 34, 35 prevents, for example, the host system coupled to the port 34 from improperly accessing the section 25 of the storage memory allocated to the host system coupled to the port 35. As discussed in more detail below, the configuration and allocation functions performed by system calls may be performed only by the external control device 28 or by the external control device and only a subset of the host systems coupled to the ports 34–36.

Figure 2:
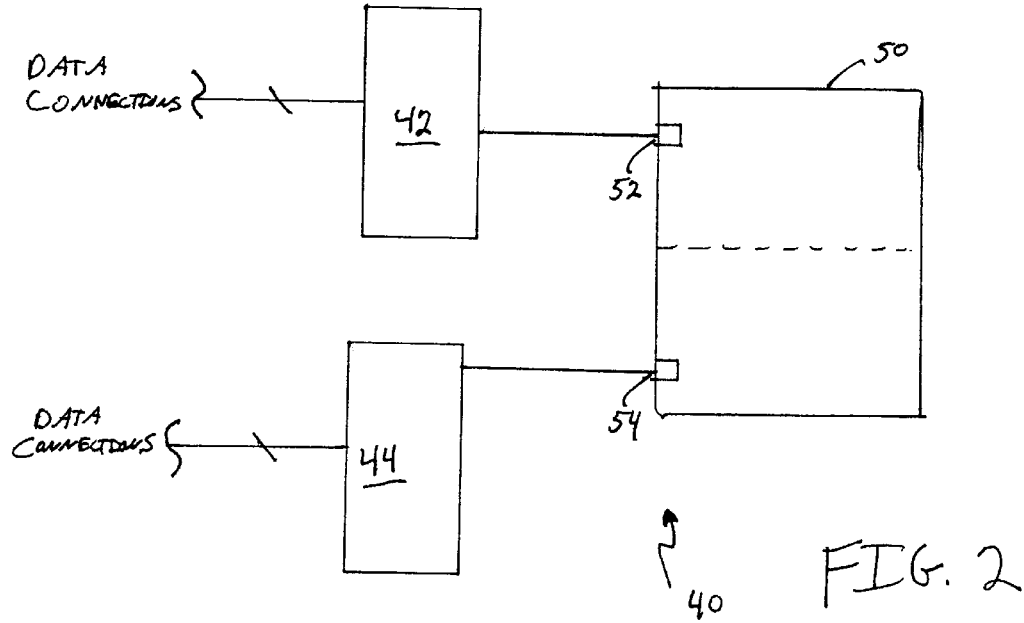
FIG. 2 is a schematic diagram that illustrates a plurality of storage devices configured according to the present invention.

Referring to FIG. 2, a system 40 illustrates a configuration where other data storage devices are coupled to another storage device. The system 40 includes a first data storage device 42, a second data storage device 44, and a third data storage device 50. The first data storage device 42 is coupled to third data storage device 50 via a port 52. The second data storage device 44 is coupled to the third data storage device 50 via a port 54.

The system 40 shown in FIG. 2 could represent, for example, a third party data backup scheme where a first entity controls the first data storage device 42, a second, unrelated, entity controls the second data storage device 44 and where both the first and second entities obtain data backup services from a third entity that controls the data storage device 50. In some instances, the data storage device 50 is provided in a location that is remote from the locations of the first and second data storage devices 42, 44. In such a configuration, it may be useful to inhibit system calls at the ports 52, 54 to prevent the data storage device 42 coupled to the port 52 from accessing portions of the data storage device 50 that are allocated for use by the data storage device 44 coupled to the port 54. Similarly, it may desirable to inhibit system calls at the port 54 to prevent the data storage device 44 from accessing portions of the data storage device 50 allocated for use by the data storage device 42. A mechanism for inhibiting such access is discussed in more detail hereinafter.

Figure 3:
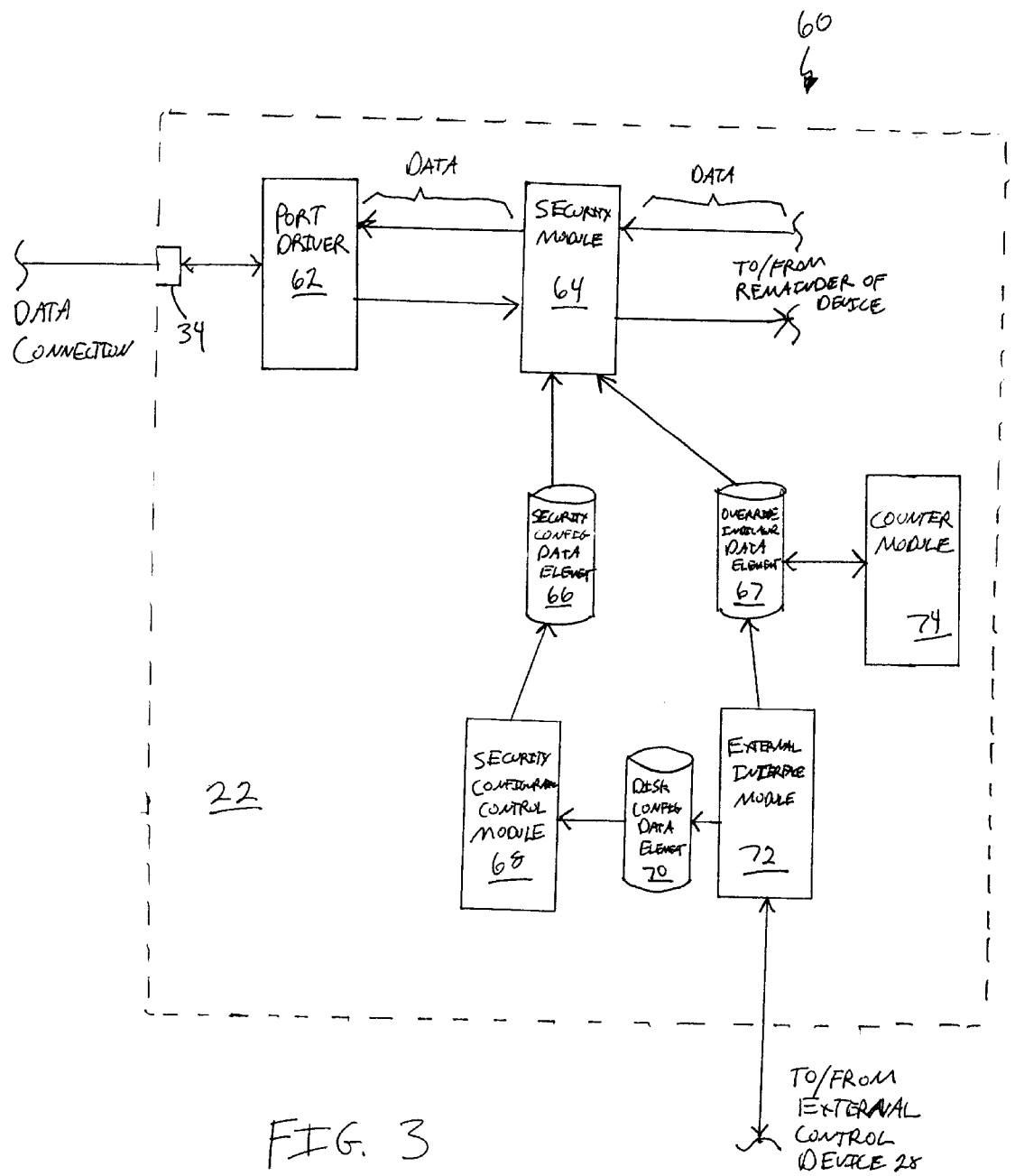
FIG. 3 is a data flow diagram that illustrates operation of an embodiment of the present invention.

Referring to FIG. 3, a data flow diagram 60 illustrates operation of software that handles communication and system call enabling and disabling at the ports 34–36 of the data storage device 22. A port driver 62 receives data provided to the data storage device 22 via the port 34 and provides data from the data storage device 22 through the port 34 to a host system coupled thereto (not shown). The port 34 provides communication between the host system and the data storage device 22. The diagram 60 only shows a single port 34 and a corresponding single port driver 62 in order to facilitate the discussion that follows. However, it may be appreciated by one of ordinary skill in the art that the functionality described herein is extendable to any or all of the ports 34–36 of the data storage device 22.

The port driver 62 is coupled to a security module 64 so that all data going in to and out of the data storage device 22 via the port 34 is controlled by the security module 64. Thus, as shown in FIG. 3, the security module 64 includes connections to and from the remainder of the data storage device 22 to provide normal functionality thereof. However, as discussed in more detail below, the security module 64 may inhibit the transfer of data and/or system calls from/to the data storage device 22 under certain circumstances. Operation of the security module 64 is discussed in more detail hereinafter.

The security module 64 is provided with security configuration information from a security configuration data element 66. As discussed in more detail below, the security configuration data element 66 controls operation of the security module 64 and thus controls the data that may be provided to and from the port driver 62. The security module 64 is also provided with information from an override indicator data element 67 that also controls operation of the security module 64. A security configuration control module 68 controls the contents of the security configuration data element 66 to indicate the type of access permitted at the port 34 through the port driver 62. The security configuration control module 68 can provide data indicating whether system calls are accepted by the port driver 62 and subsequently handled by the remainder of the data storage device 22.

In some embodiments, the override indicator data element 67 contains one variable for each of the ports 34–36, where each of the variables take on one of three values indicating one of: no override, open override, and close override. The open override value indicates that, irrespective of the settings in the security configuration data element 66, the corresponding one of the ports 34–36 will accept system calls. Similarly, the close override value indicates that, irrespective of the settings in the security configuration data element 66, the corresponding one of the ports 34–36 will not accept system calls.

The security configuration control module 68 obtains data from a disk configuration data element 70 that is stored in an internal non-volatile area of the data storage device 22 (e.g., provided on a portion of disk space used for general control of the data storage device 22). The disk configuration data element 70 includes information regarding the type of access that is permitted to each of the ports 34–36 of the data storage device 22.

An external interface module 72 includes conventional software for communicating with the external control device 28. The external interface module 72 provides a mechanism for modifying the disk configuration data element 70 to indicate the type of access provided at each of the ports 34–36 of the data storage device 22. Note also that, as discussed in more detail below, the external interface module 72 may provide a mechanism for overriding the data of the security configuration data element 66 by writing to the override indicator data element 67. The override may be permanent or may be set to a predetermined amount of time, such as thirty minutes. In the case of the override being set to a predetermined amount of time, a counter module 74 interacts with the override indicator data element 67 to reset the override after the amount of time. The mechanism for this is discussed in more detail below.

Figure 4:
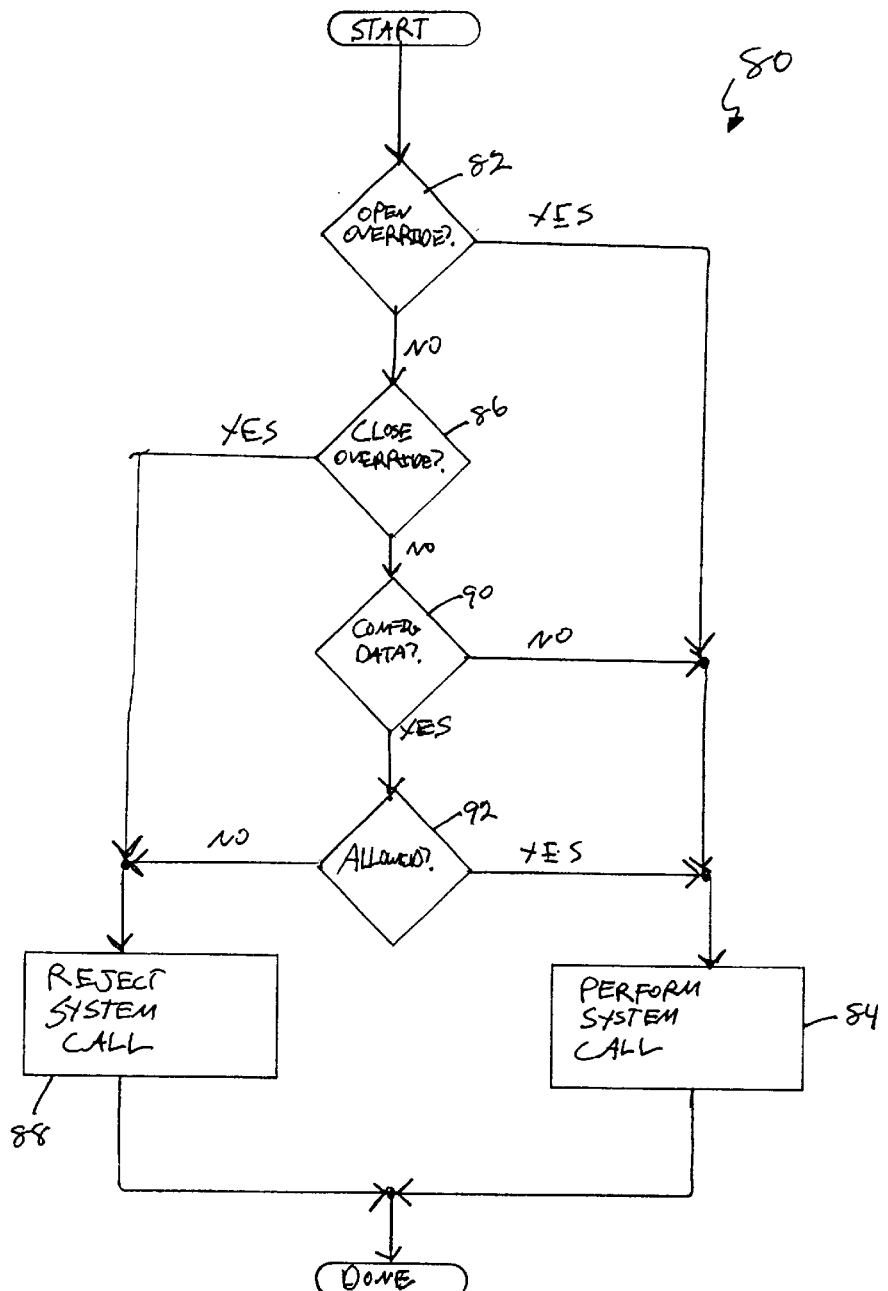
FIG. 4 is a flow chart that illustrates steps performed according to an embodiment of the present invention.

Referring to FIG. 4, a flow chart 80 illustrates operation of the system described herein. At a first test step 82, it is determined whether the open override has been set. An open override occurs when a user at the external control device 28, having appropriate access security, indicates that an override of the default settings for the security of one or more of the ports 34–36 is desired. If so, the user uses the external interface module 72 to access the override indicator data element 67 accordingly. In one embodiment, the open override may be set by a user with system control security and may only exist for a predetermined amount of time after being set. The time limit may be implemented by the counter module 74 of FIG. 3 in a conventional manner which counts for the predetermined amount of time (e.g., thirty minutes) after the open override is set and provides an appropriate reset to indicate no override after the predetermined amount of time.

If it is determined that the test step 82 that the open override has been set, then control passes from the test step 82 to the step 84 where the system call that is requested at the port is performed (i.e., is passed through to the remainder of the data storage device 22). Irrespective of any other configuration setting for the port 34, if the open override has been set, then any system calls presented at the port 34 are executed for so long as the open override remains in effect.

If it is determined at the test step 82 that the open override is not set, then control passes from the test step 82 to a test step 86 where it is determined if a close override has been set. Just as with the open override, the close override being set indicates that, irrespective of any other settings for the port 34, no system calls will be allowed at the port for so long as the close override remains in effect. Also, just as with the open override, the close override may be set for a predetermined amount of time, such as thirty minutes, and then reset thereafter, using the counter module 74.

If it is determined that the test step 86 that the close override has been set, then control passes from the test step 86 to a step 88 where the system call requested by a host system coupled to the port 34 is rejected. Rejecting the system call at the step 88 includes not performing the operation(s) dictated by the system call and returning a code to the requesting host system indicating that the system call has been rejected.

Following the test step 86 is a test step 90 which determines if configuration information exists for the port. In some embodiments, it may be possible to eliminate altogether the security configuration data element 66 (or alternatively, not create the security configuration data element 66 in the first place), in which case it is assumed that there is no security that thus all system calls may be requested at any of the ports 34–36. Thus, if it is determined at the test step 90 that there is no configuration information (i.e., no security configuration data element 66), then control passes from the test step 90 to the step 84 where the system call is performed.

If it is determined at the test step 90 that there is configuration data (i.e., the security configuration data element 66 exists), then control passes from the test step 90 to a test step 92 where the configuration information is examined to determine if a system call may be requested through the port 34. This may be indicated in the security configuration data element 66 in any one of a variety of conventional manners, including having a Boolean variable (flag) for each port indicating whether system calls are permitted at each of the ports. If it is determined at the test step 92 that system calls are not allowed, then control passes from the step 92 to the step 88 where the requested system call is rejected, as discussed above. Alternatively, if it is determined at the test step 92 that system calls are allowed, then control passes from the test step 92 to the step 84 where the system call is performed.

Note that the technique described herein may be generalized so that operations are performed and resources are allocated/assigned based on the identity of the requestor of the information (i.e., the identifier of the host system). Thus, the technique may be generalized as providing a mechanism where the identifier of a requester (or group of requesters) is provided with particular access type or permissions to perform specific operations to or with certain devices or certain pools of devices (e.g., collections of devices). Thus, rather than simply restricting system calls on a port by port basis, it may be sufficient to indicate that a particular host system (or group of host systems) is or is not allowed to make system calls at any of the ports (or pool of ports). In addition, such a generalized scheme may be used to selectively allocate access to memory locations (e.g., the pool of devices) based on the identifier of a host system or group of host systems.

In a generalized system, a system call may consist of a requestor ID, an access type, and a corresponding device. Optionally, a password may be used and/or the password may be associated with the requestor ID and/or with a group to which the requestor belongs. The requestor may be a host computer, another data storage device, or any system capable of making a system call to the data storage device. The access type may indicate the type of access requested, such as disk mirroring, backup, copy, BCV operations, ChangeTracker operations, etc. BCV and ChangeTracker operations are provided by EMC Corporation of Hopkinton, Mass. involve handling mirrored volumes. BCV relates to volumes that are start out as mirrored volumes and are then split to operate independently. ChangeTracker involves tracking differences between split volumes by tracking operations to each so that if one volume needs to be restored from another, only the changed tracks need to be written.

In some embodiments, the access control includes controlling read and write operations, while in other embodiments, only system administrative calls are controlled. The corresponding device may indicate the device affected by the request, so that, for example, if the request includes a disk read operation, the device would be the disk (or portion of a larger disk space) affected by the read operation.

Referring to FIG. 5, a matrix 100 illustrates providing information associating requestor systems Q, R, S, T and V (and groupings of the requestor systems) to access levels B, C, and M for devices W, X, Y and Z (and pools of the devices). In some embodiments, the pools of devices may have a unique ID as opposed to the combination ID illustrated in FIG. 5.

The matrix 100 has columns 102, 104, 106, 108 and 110 of various possible combinations of the devices W, X, Y and Z, and pools of the devices. A system may have more or less devices than the four shown in the matrix 100, and the matrix 100 may alternatively be in the form of a chart, a list, a database or any other technique for associating levels of permission with combinations of requesting users and permitting resources. The matrix 100 has rows 112, 114, 116, 118 and 120 corresponding to requestor systems Q, R, S, T and V, such as host computers or other electronic devices, that may make access requests of devices that are part of the data storage device 22. The number of requestors may be of any number.

The groupings of requestors may be made by a system administrator to provide improved speed of access by reducing the amount of searching that must be performed to find the proper combination of requestor and accessed devices. For example, all the members of a work group might have individual access ID numbers assigned that include as a part of the individual access ID number, a workgroup ID number. Thus when the individual is accessing the memory element that is accessible to all members of the work group, then the group ID number may permit more rapid searching of the database. Note also that, in instances where passwords are used to identify requestors, the passwords may be assigned to the requestors and/or assigned to groups in a manner similar to the way that ID numbers are assigned and the access may be controlled using the passwords either by themselves or in combination with the ID numbers.

Note that some systems may be handled in accordance with the described embodiment by means of assigning a default access ID (and/or default password) to an access request that does not contain a valid access ID (and/or password). In the matrix 100, the default ID is represented by the requestor V in row 118. Note that requestor V has no permitted access to any of the devices except for B type access to device X in column 106. Device X might, for example, represent a public library database that is intended for use by anyone with an Internet connection. Many other potential uses for such an open access may be imagined.

On the other hand, requestor Q in row 114 appears to have complete access to all members of the device pool of the exemplary matrix. Requestor Q might represent the ID of a system administrator, and thus need to be allowed unlimited access to all memory elements for the purposes of control and configuration. Between the two described cases may exist an unlimited number of possible combinations. Note that many more potential access levels than the three shown exemplary levels are possible in accordance with the embodiment described. Also note that providing an individual requestor with particular access levels to the devices (pools of devices) may be accomplished by forming a group containing only the individual requestor.

The group of four requestors (Q, R, S and T) in row 112 are shown as having less allowed access permitted at each of the device pools 102–110 than some of the individual requestors would have as members of different groups. In this example, row 118 which contains the default value V, is not of interest since requestor V is not a part of the requestor group of row 112. In row 120, requestor S has B and C access allowed with device pool column 102, which in the example contains all of the four devices represented by W, X, Y, and Z. Thus the requestor grouping R and S, row 116, would not typically be allowed more than B and C access, and in the example has no access allowed. This might be the case if requestor R was allowed access only to databases contained in, for example, devices corresponding to memory elements W and Z. Further, the four requestor grouping of row 112 may not be allowed greater access than that allowed to a subset grouping, and the group of the row 112 is thus shown as also having no access to device pool of the column 102.

Examples of situations that might allow a requestor such as Q from FIG. 5 to have a great deal of access to all of the memory devices and pools of devices might include a memory system administrator who could allow a password to be reset if lost or forgotten, to override any access control settings for maintenance or service, to allow new memory devices such as new disks to be added or old models removed from the device pools, to reconfigure the membership of the device pools to accommodate changing memory requirements, to create new memory device pools to allow for expanded customer bases, or to provide any other functionality that is provided by a system administrator. An administrator might also reconfigure the membership and number of requestor groups to improve the speed of access control to the device pools, or to define new levels of permitted access, or newly allowed types of system calls to be added as appropriate for the overall data storage device.

When the device and the device pools correspond to portions of memory, the above noted situations relate to the ability to provide authorized users with efficient and flexible memory access to a partitionable data storage device, while retaining the security of confidential user data in the data storage device. The authorization system described provides a mechanism whereby potentially dangerous memory accesses and functions may be rejected or accepted in a uniform fashion, and the access decision may be made before valuable system time is wasted on beginning a memory access execution that may turn out not to be authorized.

Authorization codes (and/or passwords) may be used on either an individual host computer or other requestor basis, on a group access basis, or on a combination basis such as shown in the matrix of FIG. 5. If the method is restricted to an ID per potential requestor, then the authorization matrix may be large, and locating the requestor ID might take more time than if requestors were grouped. On the other hand, limiting the access ID numbers to large groups of requestors acts to limit the flexibility of assigning optimum accessibility to various members of the requestor group. Thus the described embodiment may be beneficially provided with access ID numbers for each individual requestor to provide maximum flexibility, and with group ID numbers that may serve to increase the access authorization speed by matching group access values against device pool access values. In other embodiments, access ID numbers are only assigned to groups and are not assigned to individual requestors. A two access matrix method may be used to provide both maximum flexibility and improved authorization speeds in which the first matrix (or other previously described authorization method) examines the requestor group ID versus the device pool ID. If the entire group to which the individual requestor belongs has authorized access for every member of the particular device pool addressed for the type of access requested, then there is no need to look any further. This may be the case if the requestor group ID is allowed only as much access as the lowest member of the group, and if the device pool is only allowed as much access as the most restrictive member of the pool. An example of an access matrix following the above described situation is shown in FIG. 5, as previously discussed. Thus the described access control method may support varying levels of device pool access, with each level of access corresponding to a certain level or combination of access operations. Further, the described method may be compatible with existing methods of blocking dangerous device access operations, such as system calls, by the use of default access ID numbers and allowing physical memory structures such as communication ports to have device pool ID numbers.

The embodiment described above with reference to FIG. 5, includes the feature of having a requestor in more than a single requestor group. A unique requestor ID number may be assigned to an individual host computer system for each requestor group of which the host is a part. Alternatively, the unique ID may be composed of a combination of the group ID and the individual ID number. A combination ID number may take advantage of the two stage matrix access authorization method previously described. Also, in any event, passwords may be used instead of, or as a supplement to, the ID's.

An exemplary configuration for access control of a data storage device may include commands to enable and disable the ID number system (and/or password system), define default and initial access levels for host systems and other requestors, a system administrator password, granting specified ID numbers partial administrator-like access, a temporary override command denying any access to a specified requestor ID for a predetermined amount of time, and a temporary override command giving complete access to a specified ID for a predetermined amount of time. Use of these commands may be restricted to a system administrator who enters the system using a password.

Figure 6:
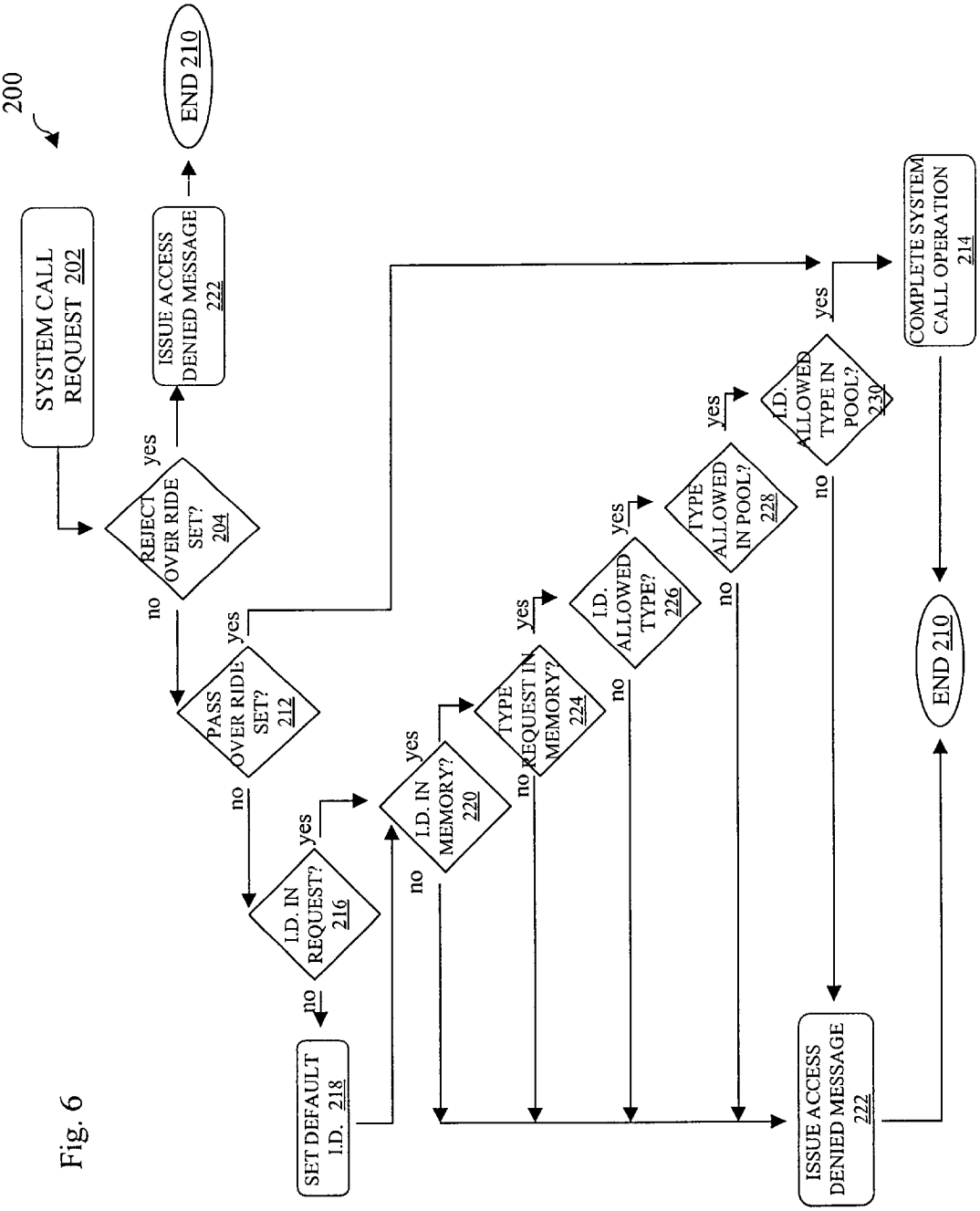
FIG. 6 is a logic flow chart that illustrates the operation of a user logical device embodiment of the present invention.

Referring to FIG. 6, a flow chart 200 shows processing beginning at a step 202, where a requestor system, which may be a host computer, or any other type of electronic equipment such as another memory system, which has access to the data storage device, makes a request for access to a particular device or pool of devices, such as a request to read and write memory, or makes a system call, such as a request copy, mirror data, a BCV operation, a Change-Tracker operation, or back up data. System calls may come directly from the host computer system, or may be relayed by another data storage device, as may be the case in a mirroring request. In some embodiments, only system calls are supported and direct read and write operations are not processed on the number discussed herein.

Following the step 202 is a step 204, where the ID of the host system (the ID of the group to which the host system belongs) making the system call request is checked against a reject override setting to determine if a reject override has been set. The override setting may be stored as a variable in a memory override location. A reject override being set indicates that a system call will be denied irrespective of the access settings for the ID and the corresponding device. Such a reject override condition may be set by a system administrator for many possible reasons, such as system failure, and there may be a timer set to return such an override condition to a no override status following a fixed time period after the override is set. If it is determined at step 204 that there is a reject override set, then the request is not allowed by the data storage device, the data storage device may send an access denied message to the requestor system at a step 222, and the request process ends at a step 210.

If it is determined at the step 204 that no reject system call override has been set, a pass override setting (also possibly stored in the memory override location or possibly in a different location) is checked at a step 212. A pass override indicates that a system call will be allowed irrespective of the access settings of the requestor and the corresponding device. If a pass override has been set, then the storage system completes the system call at a step 214, and processing ends at the step 210. Optionally, a message indicating that the system call access was allowed and completed may be sent to the requesting system.

If there is no pass override set, then the call request is examined to determine if an access ID number is included in the request at step 216. Not all user systems connected to the data storage device may have access ID numbers. The access ID may be the same as the requestor ID, or it may be a different unique number or it may be the ID of the group to which the requestor belongs. In some instances, older systems may still be in use that do not have the capability of newer systems (i.e., an ID or group ID), and thus provides backward compatibility to expand the utility of the system and eases new product introduction. Note also that a password may be used instead of, or as a supplement to, the access ID. If a proper access ID is found in the request, control passes to step 220. If no access ID is found, then a default ID is assigned at step 218 and control passes to step 220 where the access ID is checked to determine if the access ID is valid. If the access ID number is not found in a table of allowable access ID numbers, then control passes to step 222 where a system call access denied message may be sent to the requesting system, and the process ends at the step 210.

If the access ID is matched by the data storage device, then the type of access request is checked at step 224 to determine if the requested specific type of system call is allowed. If the type of request being made is not allowed for the corresponding device (device pool), then control passes to step 222, where a system call access denied message may be sent to the requesting system, and then processing ends end at step 210.

If the request type is generally allowed, the access ID is checked at step 226 to see if the particular requestor (the group to which the requestor belongs) is allowed the particular type of system call requested with respect to the corresponding device (device pool). If not, then control passes to step 222, where a system call access denied message may be sent to the requesting system, and then processing ends at step 210. If the ID is allowed the general use of the type of call that is made, then control passes to step 228 where the device that is affected by the system call is checked to determine if the corresponding pool of devices allows the type of access requested. If the type of access requested is not allowed, then control passes to step 222, where a system call access denied message may be sent to the requesting system, and then processing ends at step 210.

If the device pool does allow the type of access requested, then it is determined at step 230 if the requested access is allowed. This helps maintain a situation where requests are confined to the requestors assigned specific access to device pools such as portion or portions of the memory space of the data storage device. If the ID does not have appropriate access to the device pool, then control passes to step 222 where a system call access denied message may be sent to the requesting system, and the access process ends at step 210. If there is a match between the access ID number, the device pool ID number, and the type of access requested then the system call is completed at step 214, and then the access process ends at the step 210.

The code for the flowchart of FIG. 6 may be implemented using a scheme similar to that shown in FIG. 3 and described above. That is, a security module (similar to the security module 64 of FIG. 3) will perform the steps set forth in FIG. 6. The security data, indicating which groups of users have what types of access to which pools, may be centralized in a conventional manner to provide the functionality described herein. The override settings may be stored in an override memory location. Other techniques for implementing the flowchart of FIG. 6 may be obvious to one of ordinary skill in the art.

The system described herein determines the ID of the user (and/or of the group to which the user belongs) making the system call request, what device pool is involved in the request, what type of request is being made, and whether the system has been configured to allow the request. The device pools may be portions of the memory system divided into separate physical disks, groups of disks, or portions of large disks. The memory resources may be grouped into memory pools that have the same requirement for types of system calls allowed, and for what specific requestors (or groups of requestors) are allowed to have access to the memory. For example, a pool X may have twenty disk systems and have access allowed only to requestors from company A. Pool Y may comprise a portion of a large magnetic disk and allow access by companies A and B, but no mirroring requests by anyone, other than the system administrator, will be allowed. Because the embodiments described allow access based on an ID number, it is possible to give a single large computer with multiple human users a number of different access ID numbers and thereby provide that each different user (and/or groups of users) have different levels of access to different portions of the storage device. This may be useful in cases where different departments in a single company wish to prevent other departments from changing values in a database, or wish to prevent the departments from using more memory space than allowed. The embodiments described herein use the requestor ID number (group ID number) to determine storage access and type of access, and thus constitute a logical device regulator, rather than using a physical regulation means such as controlling access depending upon which memory port the requestor is connected to. As described herein, passwords may be used in place of, or as a supplement to, ID's.

An example of steps for creating access ID numbers and registering them with the data storage device includes a host computer system (or other requestor system type) administrator invoking a utility program to obtain the unique hardware ID of the host computer system, an ID of the group to which the host system belongs, a password for the host system, a password for a group to which the host system belongs, and/or a Fibre Channel worldwide name, and also determining if there exists a need for multiple access ID numbers for the host system. The host administrator supplies the hardware ID (or password or Fibre Channel worldwide name) and the name and operating system used by the host to the system administrator. If multiple individual users are associated with the host system and each need different levels of access, then individual passwords or ID numbers may be assigned to each user. These may be combined with the host system ID number to produce unique ID numbers for each user which may still provide host system information. The users may be grouped and the ID numbers may be provided to each of the groups.

For additional security, the ID numbers may be further randomized by the memory administrator running the ID numbers through what is known as a secure hash program to generate unique ID numbers, called access ID numbers in this case. Note that in instances where different hardware devices have the same ID numbers, the access ID numbers may be generated by using additional, perhaps random, data as input to the secure hash function. The data storage device stores the access ID and associates it with selected device pools, such as memory elements. The memory elements may either be single elements such as a disk or portion of a disk, or a group of memory elements. Once the access is associated with particular device pools, the system administrator may assign or remove access levels. With the use in this exemplary embodiment of the secure hash program, the access ID numbers may not even be known by the host system, but are recreated from the hardware ID at the time of access, thus preventing any access from a location different from the authorized host system.

Figure 7:
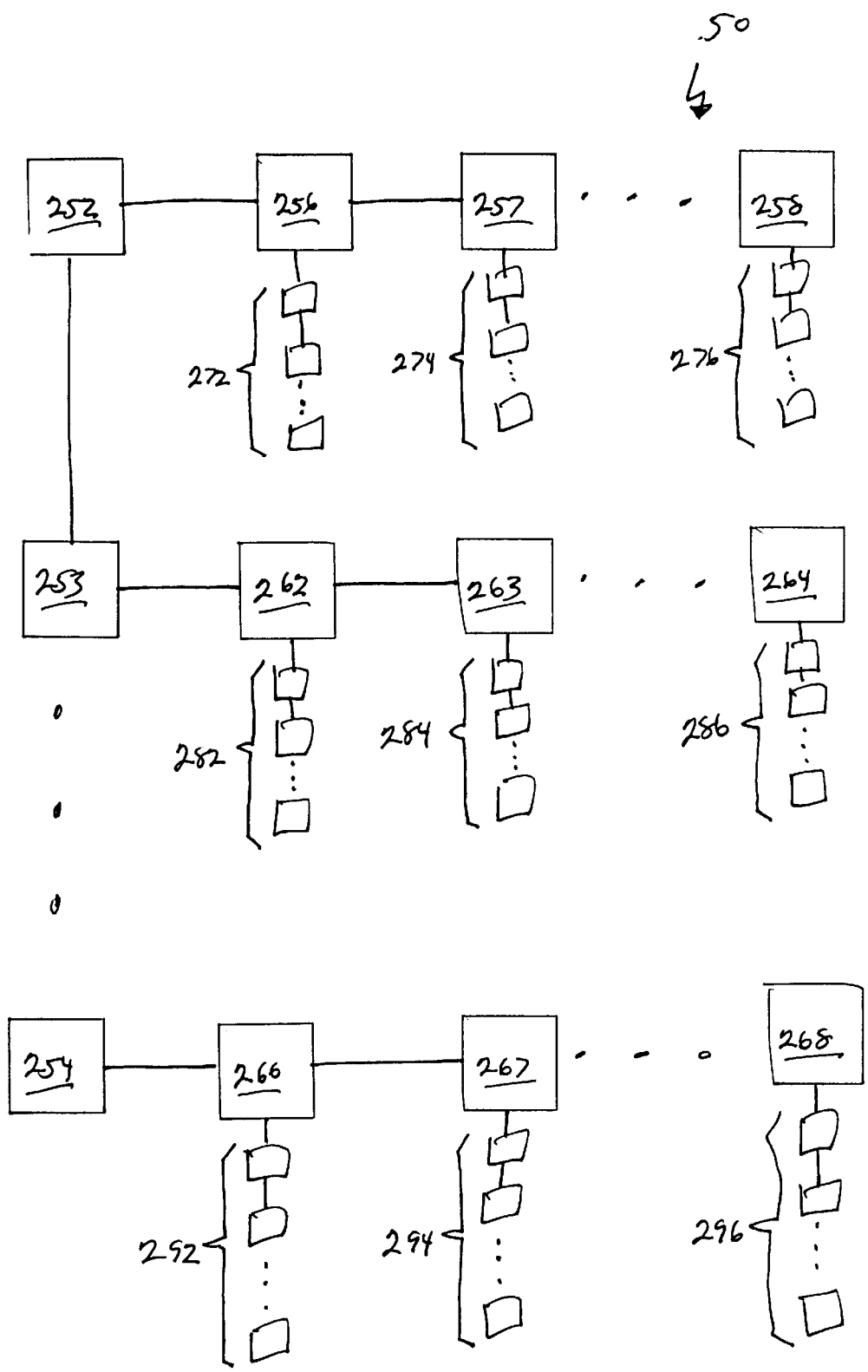
FIG. 7 is a diagram illustrating a data structure for storing security data according to an embodiment of the present invention.

Referring to FIG. 7, a diagram 250 shows another embodiment where security data may be stored in a different manner. The diagram 250 shows a plurality of nodes 252–254 stored as a linked list. Each of the nodes 252–254 may correspond to a user or group of users. Thus, for the discussion herein, the term "user" may be deemed synonymous with a group of users consistent with the discussion elsewhere herein.

For each of the users, there is a plurality of allowable actions associated therewith so that, for example, a user corresponding to the node 252 may perform actions corresponding to a plurality of nodes 256–258 attached to the node 252. Similarly, a user corresponding to the node 253 may be allowed to perform actions corresponding to a plurality of attached nodes 262–264 and a user corresponding to the node 254 may be allowed to perform actions corresponding to a plurality of attached nodes 266–268. Each of the actions may be associated with one or more devices or, in some instances, actions have no devices associated therewith. Each of the nodes 256–258, 262–264, 266–268 corresponding to actions has a list of nodes associated therewith corresponding to allowable devices. Thus, for example, the action corresponding to the node 256 has a list 272 coupled thereto where the list 272 contains nodes corresponding to acceptable devices for the action corresponding to the node 256 and the user corresponding to the node 252. Similarly, the node 257 has a list 274 coupled thereto and the node 258 has a list 276 coupled thereto. Other device lists 282, 284, 286, 292, 294, 296 are also shown.

The user nodes 252–254 represent any number of users. That is, there may be any number of users and any number of nodes rather than the three nodes 252–254 shown in the diagram 250. Similarly, there may be any number of actions associated with each user and any number of devices associated with each action. Furthermore, in some embodiments, one or more of the user nodes 252–254 may represent a default user, as discussed in more detail below.

The action nodes, such as the nodes 256–258 that are coupled to the user 252, represent various types of actions that a user may perform. Thus, the user corresponding to the node 252 may perform the actions corresponding to each of the nodes 256–258 coupled thereto. That is, the linked list having the nodes 256–258 contains an entry for each of the actions that are authorized for the user corresponding to the node 252.

For each of the actions in the action node list, there is a list of permissible devices on which the action may be performed. Thus, for example, for the node 256, the nodes in the list 272 indicate which devices may be used in connection with the action corresponding to the node 256 which may be performed for the user corresponding to the node 252. Note that, for some actions, the link list corresponding to devices may be null (i.e., may contain no entries). This occurs for actions that are not performed on specific devices, such as a system call requesting a user ID. In addition, it is possible for user to create a user defined actions that may or may not correspond to any devices, as discussed in more detail below. Thus, for an action that may be performed by the data storage device 22, the user could first make a request to determine if the desired action is authorized. Then, if the action is authorized, the user could request that the data storage device 22 perform the action. Alternatively, for an action that can not be performed by the data storage device 22, the user may simply perform only the authorization request step.

In practice, when a user requests if a specific action may be performed using one or more specific devices (or no device, as the case may be), the user nodes 252–254 are first scanned to find a node corresponding to the requesting user. Once a matching node is located, then the attached list containing nodes corresponding to actions is reviewed to determine if the requested action is allowed for the requesting user. Once it is determined the action is allowed then, if the action is one that requires specific devices, then the list corresponding to the devices, that is coupled to the node corresponding to an action, is scanned to determine if the device or devices requested in connection with the action of the user are allowed.

In some embodiments, it is possible to use the user definable actions to create a system for returning permissions (i.e., allowed or denied) for actions that are not even performed on or by the storage device 22. In that case, a user could simply define a particular user definable action with specific permissions for various users. Then, the user definable action would be appended to one or more of the lists corresponding to specific actions. Then, a user could request permission for the particular action and receive an indicator whether the particular action is allowed or denied. Of course, if the action does not correspond to an operation of the data storage device 22, then the user would not follow up with a request that the data storage device 22 perform the action. However, in some instances, it may be useful to simply receive the allowed or denied access information.

Note that the data shown in the diagram 250 may be stored in any one of a variety of data storage techniques, including a chart, a list, a plurality of linked lists, array, and a database. In addition, the data shown in the figure 250 may be stored in the security configuration data element 66 of FIG. 3.

Figure 8:
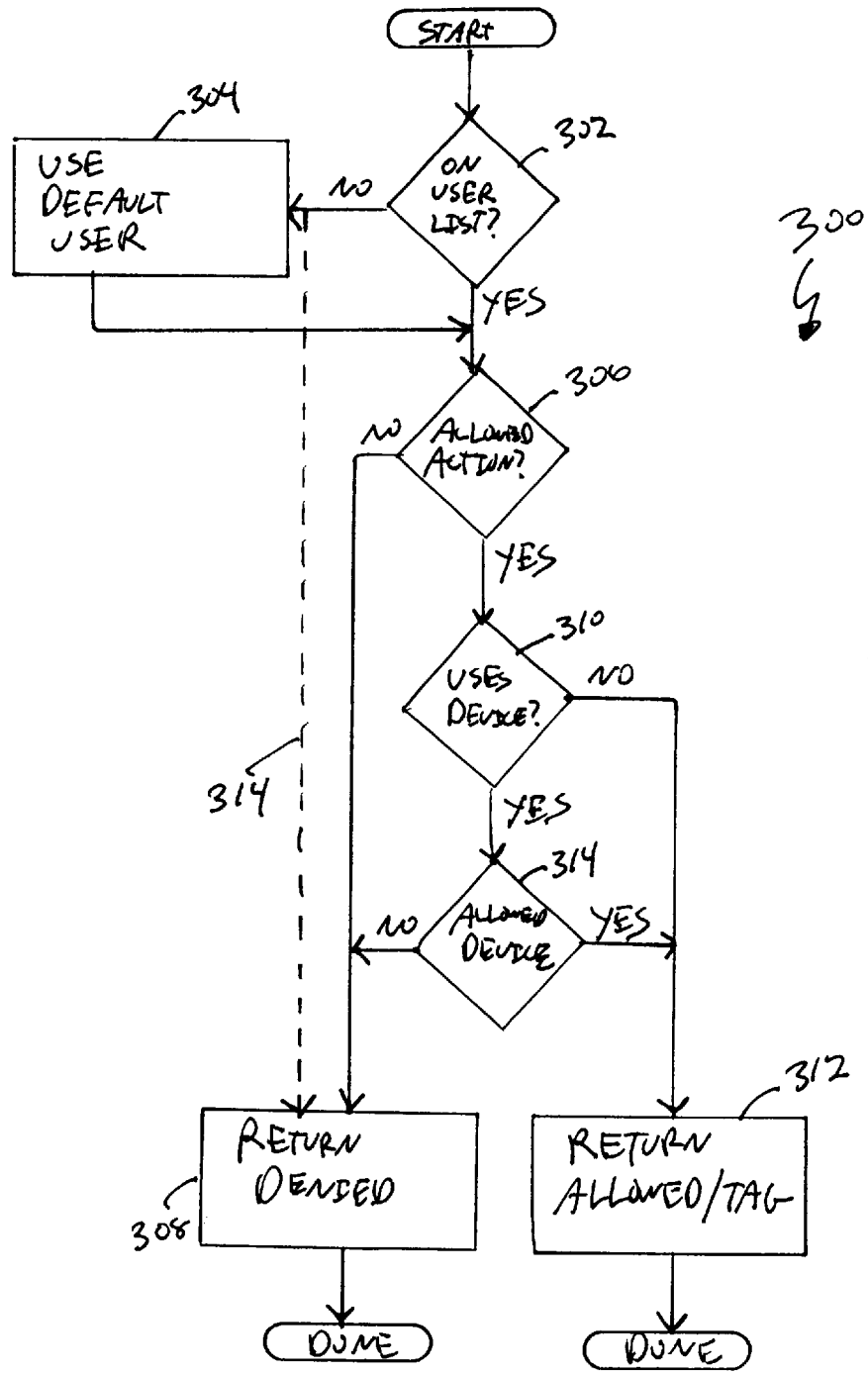
FIG. 8 is a flow chart that illustrates accessing the data of FIG. 7 according to an embodiment of the present invention.

Referring to FIG. 8, a flowchart 300 illustrates operation of the system using the data shown in the diagram 250 of FIG. 7. The flowchart 300 illustrates processing a user request for authorization of an action, optionally with devices.

Processing begins at a first step 302 where it is determined if the requesting user corresponds to a node on the user list. If not, then control passes from the step 302 to the step 304 where a node corresponding to a default user is used. In some embodiments, a default user is used for users that are not specifically listed. The default user may be associated with default actions and default devices.

Following step 304, or following the step 302 if the user is found to correspond to a node on the list, is a test step 306 where it is determined if the requested action is on the list of nodes attached to the node corresponding to the user. If not, the control passes from the step 306 to a step 308 where the request is denied. That is, if the requested action does not correspond to a node coupled to the node corresponding to the user, then the request is denied at the step 308. Denying the request may include returning a code indicating that the request is denied.

If it is determined at the step 306 that the requested action is allowed (i.e., corresponds to one of the appropriate nodes), then control passes from the step 306 to a step 310 where it is determined if the requested action uses a device. As discussed above, some actions do not require or use a device. Examples of such actions include, for example, requesting the ID of the Symmetrix. If it is determined at the test step 310 that the requested action does not include a device, then control passes from the step 310 to a step 312 where an indication is returned to the user indicating that the request is allowed. It is also possible that the step 312 to return a tag, which is discussed in more detail below.

If it is determined that the test at 310 that the requested action uses a device, then control passes from the step 310 to a test step 314 where it is determined if the device is on the list corresponding to allowable devices for the action. If not, then control passes from the step 314 to the step 308 where the request is denied. Alternatively, if it is determined at the test step 314 that the device is on the list, then control passes from the step 314 to the step 312 where the request is allowed. Following either the step 308 or the step 312, processing is complete.

In some embodiments, there may not be a default user. In that case, the step 304 would not be executed. Instead, if it is determined at the test step 302 that the requesting user is not on the list of users, then control passes from the step 302 to the step 308 where the request is denied. This is illustrated by the alternative path 314 on the flowchart 300.

In some embodiments, a tag may be used to provide a user with a password or key that may be submitted in connection with later requests. The tag may be returned in connection with the user making a successful request for authorization. The user could then use the tag in connection with performing the same operation at a later time. In some embodiments, the tag would never expire and would allow the user to perform actions even after the security of the system had been changed so that the requested operation would otherwise not be allowed.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of determining authorization for actions, comprising:
   determining if a requestor is in a list of requestors;
   determining if a requested action is in a list of action types associated with the requestor; and
   if the action uses at least one device, determining if the at least one device is in a list of devices associated with the requestor and the requested action, wherein the list of devices includes at least some devices associated with a data storage device;
   wherein said list of requestors includes information for at least one individual requestor and at least one group of requestors, and wherein the information for the least one group of requestors is separately accessible from the information for the at least one individual requestor.

2. The method, according to claim 1, further comprising:
   if the requestor is not in the list of requestors, denying authorization.

3. The method, according to claim 1, further comprising:
   if the requested action does not use at least one device, authorizing the action if the requested action is in a list of action types associated with the requestor.

4. The method, according to claim 1, wherein at least some of the action types do not correspond to actions performed on the data storage device.

5. The method, according to claim 1, wherein the action types include system calls to the data storage device.

6. The method, according to claim 1, wherein the at least one of the devices includes at least one disk storage area of the data storage device.

7. The method, according to claim 1, wherein the at least one of the devices includes communication ports of the data storage device.

8. The method, according to claim 7, wherein the action types indicate whether system calls are allowed on the communication ports.

9. A method of determining authorization for action comprising:
   determining if a requestor is in a list of requestors;
   determining if a requested action is in a list of action types associated with the recluestor;
   if the action uses at least one device, determining if the at least one device is in a list of devices associated with the requestor and the requested action, wherein the list of devices includes at least some devices associated with a data storage device; and
   if the requestor is not in the list of requestors, using a default requestor from the list of requestors.

10. A computer software that determines authorization for actions, comprising:
    executable code that determines if a requestor is in a list of requestors;
    executable code that determines if the requested action is in a list of action types associated with the requestor; and
    executable code that determines if the at least one device is in a list of devices associated with the requestor and the requested action if the action uses at least one device, wherein the list of devices includes at least some devices associated with a data storage device;
    wherein said list of requestors includes information for at least one individual requestor and at least one group of requestors, and wherein the information for the least one group of requestors is separately accessible from the information for the at least one individual requestor.

11. The computer software, according to claim 10, further comprising:
    executable code that denies authorization if the requestor is not in the list of requestors.

12. The computer software, according to claim 10, further comprising:
    executable code that authorizes the action if the requested action is in a list of action types associated with the requestor if the requested action does not use at least one device.

13. The computer software, according to claim 10, wherein at least some of the action types do not correspond to actions performed on the data storage device.

14. The computer software, according to claim 10, wherein the action types include system calls to the data storage device.

15. The computer software, according to claim 10, wherein the at least one of the devices includes at least one disk storage area of the data storage device.

16. The computer software, according to claim 10, wherein the at least one of the devices includes communication ports of the data storage device.

17. The computer software, according to claim 16, wherein the action types indicate whether system calls are allowed on the communication ports.

18. A computer software that determines authorization for actions, comprising:
    executable code that determines if a requestor is in a list of reguestors;
    executable code that determines if a requested action is in a list of action types associated with the requestor;
    executable code that determines if the at least one device is in a list of devices associated with the requestor and the requested action if the action uses at least one device, wherein the list of devices includes at least some devices associated with a data storage device; and
    executable code that uses a default requestor from the list of requestors if the requestor is not in the list of requestors.

* * * * *